US012081892B1

(12) United States Patent
Burk et al.

(10) Patent No.: US 12,081,892 B1
(45) Date of Patent: Sep. 3, 2024

(54) GENERATION OF DUMMY FRAME IN IMAGE SENSOR INTERFACE CIRCUIT RESPONSIVE TO DETECTION OF TIMEOUT ERROR

(71) Applicant: Apple Inc., Cupertino, CA (US)

(72) Inventors: Wayne Eric Burk, San Jose, CA (US); Oren Kerem, Sunnyvale, CA (US); Hoi Man S. Ng, San Ramon, CA (US); Michael Bekerman, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/120,208

(22) Filed: Mar. 10, 2023

(51) Int. Cl.
*H04N 25/76* (2023.01)
*H04N 17/00* (2006.01)
*H04N 23/95* (2023.01)
*H04N 25/703* (2023.01)

(52) U.S. Cl.
CPC ....... *H04N 25/7795* (2023.01); *H04N 17/002* (2013.01); *H04N 23/95* (2023.01); *H04N 25/703* (2023.01)

(58) Field of Classification Search
CPC .. H04N 25/7795; H04N 17/002; H04N 23/95; H04N 25/703
See application file for complete search history.

(56) References Cited

U.S. PATENT DOCUMENTS

| | | | | |
|---|---|---|---|---|
| 5,896,402 A * | 4/1999 | Kurobe | ................ | H04L 1/1809 714/763 |
| 7,349,330 B1 * | 3/2008 | Hayakawa | ............. | H04L 47/22 370/229 |
| 7,496,788 B1 | 2/2009 | Alfieri et al. | | |
| 2004/0078649 A1 | 4/2004 | Kawaguchi | | |
| 2007/0038939 A1 | 2/2007 | Challen et al. | | |
| 2012/0081580 A1 | 4/2012 | Cote et al. | | |
| 2016/0006961 A1 * | 1/2016 | Asaba | .................... | H04N 25/76 348/308 |
| 2019/0334826 A1 | 10/2019 | Hayashi et al. | | |

(Continued)

FOREIGN PATENT DOCUMENTS

WO 2008/070053 A2 6/2008

OTHER PUBLICATIONS

International Search Report and Written Opinion of the International Searching Authority directed to International Patent Application No. PCT/US2024/018891, mailed Jul. 3, 2024; 7 pages.

*Primary Examiner* — Michael E Teitelbaum
(74) *Attorney, Agent, or Firm* — Sterne, Kessler, Goldstein & Fox P.L.L.C.

(57) ABSTRACT

Embodiments relate to detecting a timeout error on receipt of valid pixel data from an image sensor by a sensor interface circuit. When the valid pixel data is not timely received at the sensor interface circuit, a timeout error signal is generated by the sensor interface circuit. A time limit for determining the timeout error signal may be defined by a global clock that provides a clock signal to the sensor interface circuit and other circuits. As a result, the sensor interface circuit generates a dummy frame and sends out the dummy frame to subsequent circuits so that the timeout error does not bottleneck subsequent processing stages. In contrast, if the valid pixel data is timely received, sensor data received from the image sensor is unpacked into a frame of pixels.

21 Claims, 6 Drawing Sheets

(56) References Cited

U.S. PATENT DOCUMENTS

| 2021/0209390 A1 | 7/2021 | Chae et al. |
| 2022/0021809 A1 | 1/2022 | Srivastava et al. |
| 2022/0283888 A1 | 9/2022 | Kim et al. |

* cited by examiner

GENERATION OF DUMMY FRAME IN IMAGE SENSOR INTERFACE CIRCUIT RESPONSIVE TO DETECTION OF TIMEOUT ERROR

BACKGROUND

1. Field of the Disclosure

The present disclosure relates to a circuit for interfacing with image sensors, and more specifically to detecting a timeout error associated with the delayed arrival of pixel data from the image sensors.

2. Description of the Related Arts

A sensor interface circuit interfaces with an image sensor to provide pixel data to other circuits. The sensor interface circuit receives pixel data from the image sensor via a bus or a communication line, and converts the received pixel data into a predetermined format (e.g., an image frame of certain dimensions). Then the sensor interface circuit sends the converted pixel data to target circuits such as an image signal processor or a memory circuit. The pixel data provided by the sensor interface circuit is often processed in an image processing pipeline before further processing or consumption. For example, raw pixel data may be corrected, filtered, or otherwise modified before being provided to subsequent components such as a video encoder.

One of the functions performed by the sensor interface circuit is detecting of various errors that may be encountered during receipt of the pixel data from the image sensors. By detecting the errors and taking appropriate measures, the subsequent circuits receiving the pixel data from the sensor interface circuit may continue to perform their functions despite the errors.

SUMMARY

Embodiments relate to a sensor interface circuit that generates a timeout signal when packed pixel data is not received from one or more image sensors within a time limit. The sensor interface circuit includes queues, error detection circuit, and an unpacking circuit. Each of the queues stores a portion of packed pixel data received from the image sensors. The error detection circuit is coupled to the plurality of queues and generates the timeout signal when a valid pixel signal is not received from the one or more image sensors within a time limit. The valid pixel data indicates the receipt of the packed pixel data at the sensor interface circuit. The unpacking generates a dummy frame of pixels when the timeout signal is received from the error detection circuit.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to detecting of a timeout error on delayed receipt of valid pixel data from an image sensor by a sensor interface circuit. When the valid pixel data is not timely received at the sensor interface circuit, a timeout error signal is generated by the sensor interface circuit. A time limit for determining the timeout error signal may be defined by a global clock that provides a clock signal to the sensor interface circuit and other circuits. As a result, the sensor interface circuit generates a dummy frame and sends out the dummy frame to subsequent circuits so that the timeout error does not bottleneck subsequent processing stages. In contrast, if the valid pixel data is timely received, sensor data received from the image sensor is unpacked into a frame of pixels.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Example embodiments of portable multifunction devices include, without limitation, the iPhone®, iPod Touch®, Apple Watch®, and iPad® devices from Apple Inc. of Cupertino, California. Other portable electronic devices include wearables, laptops or tablet computers. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
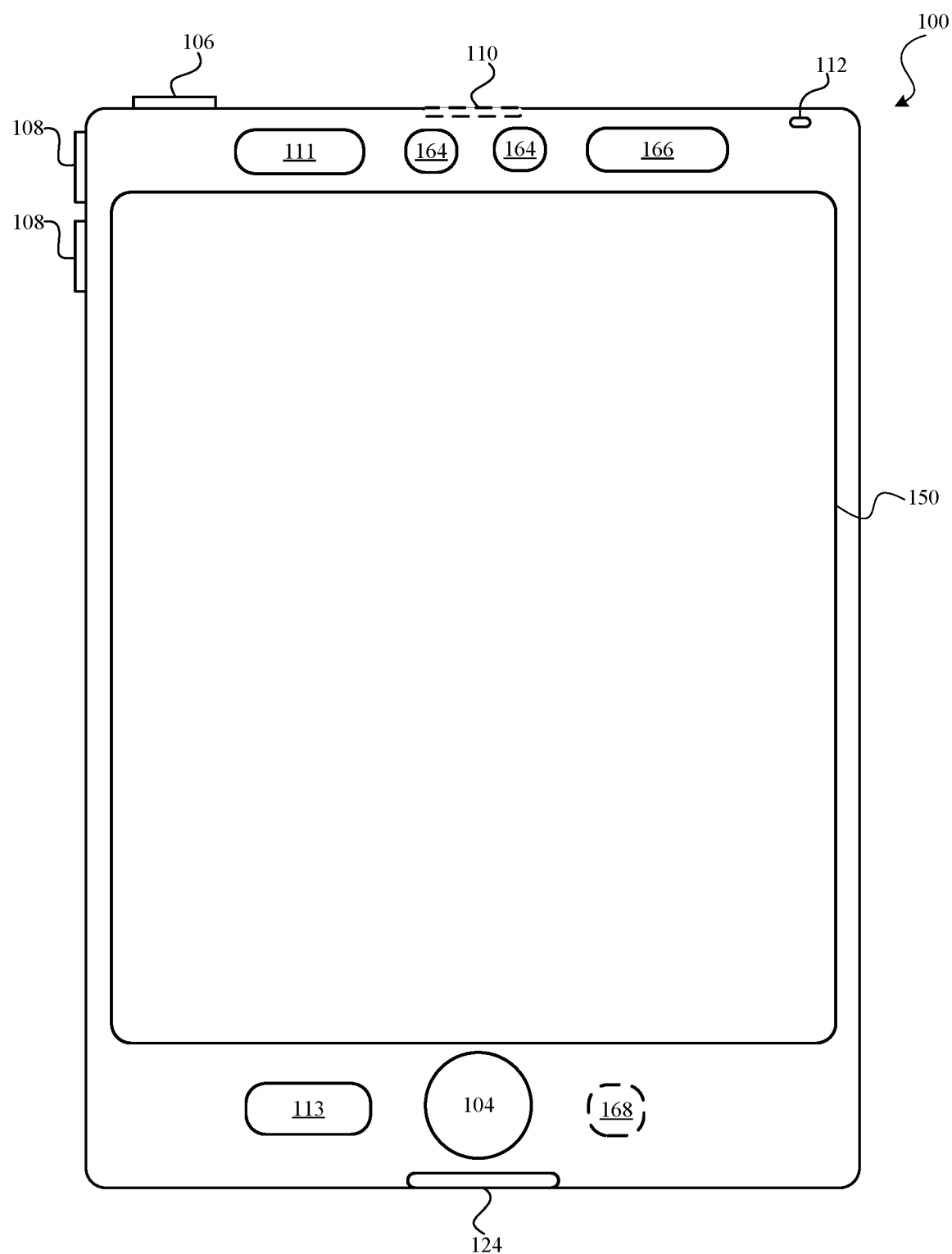
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
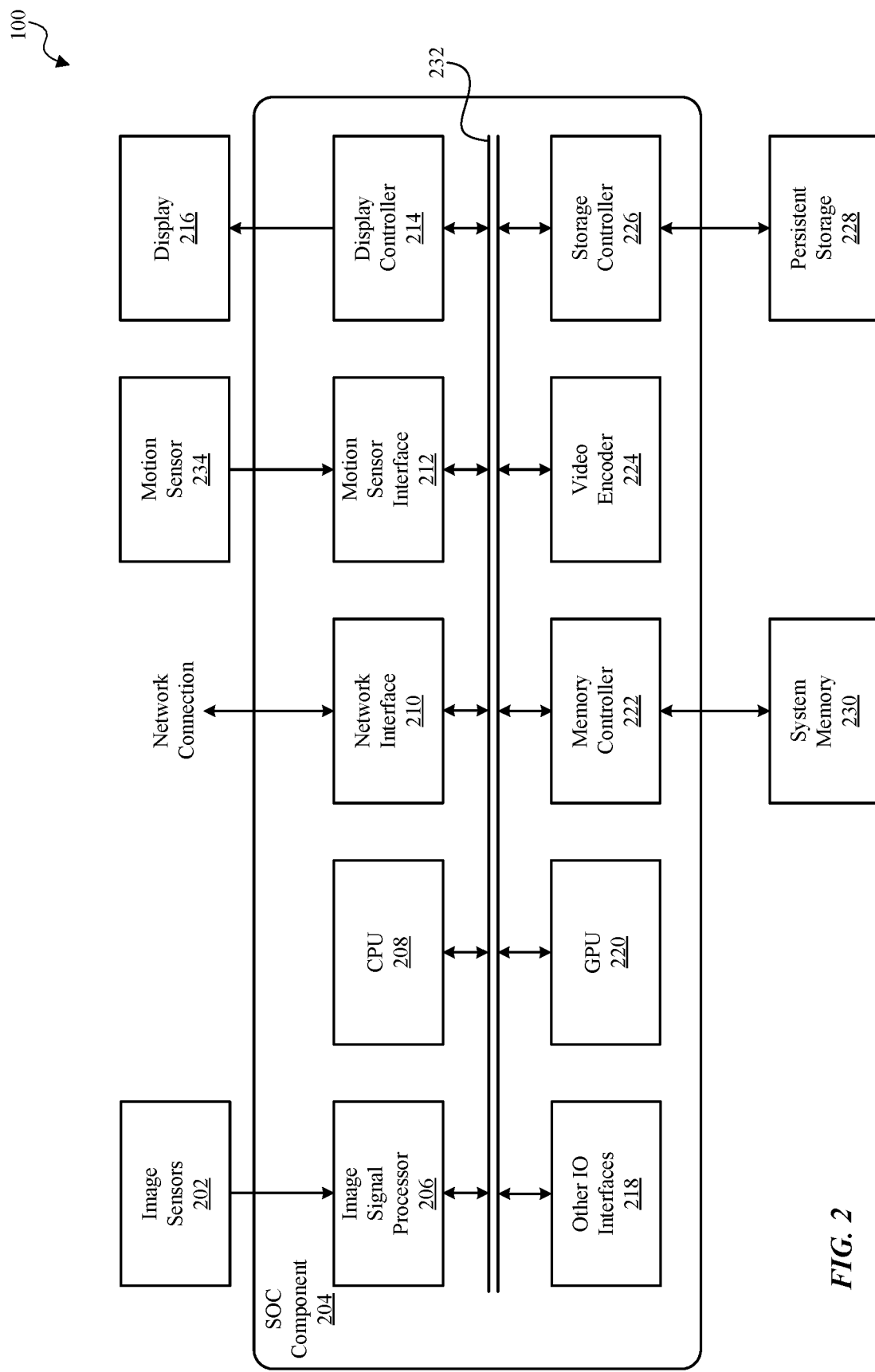
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern") or a Quad Bayer pattern. An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface circuit 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
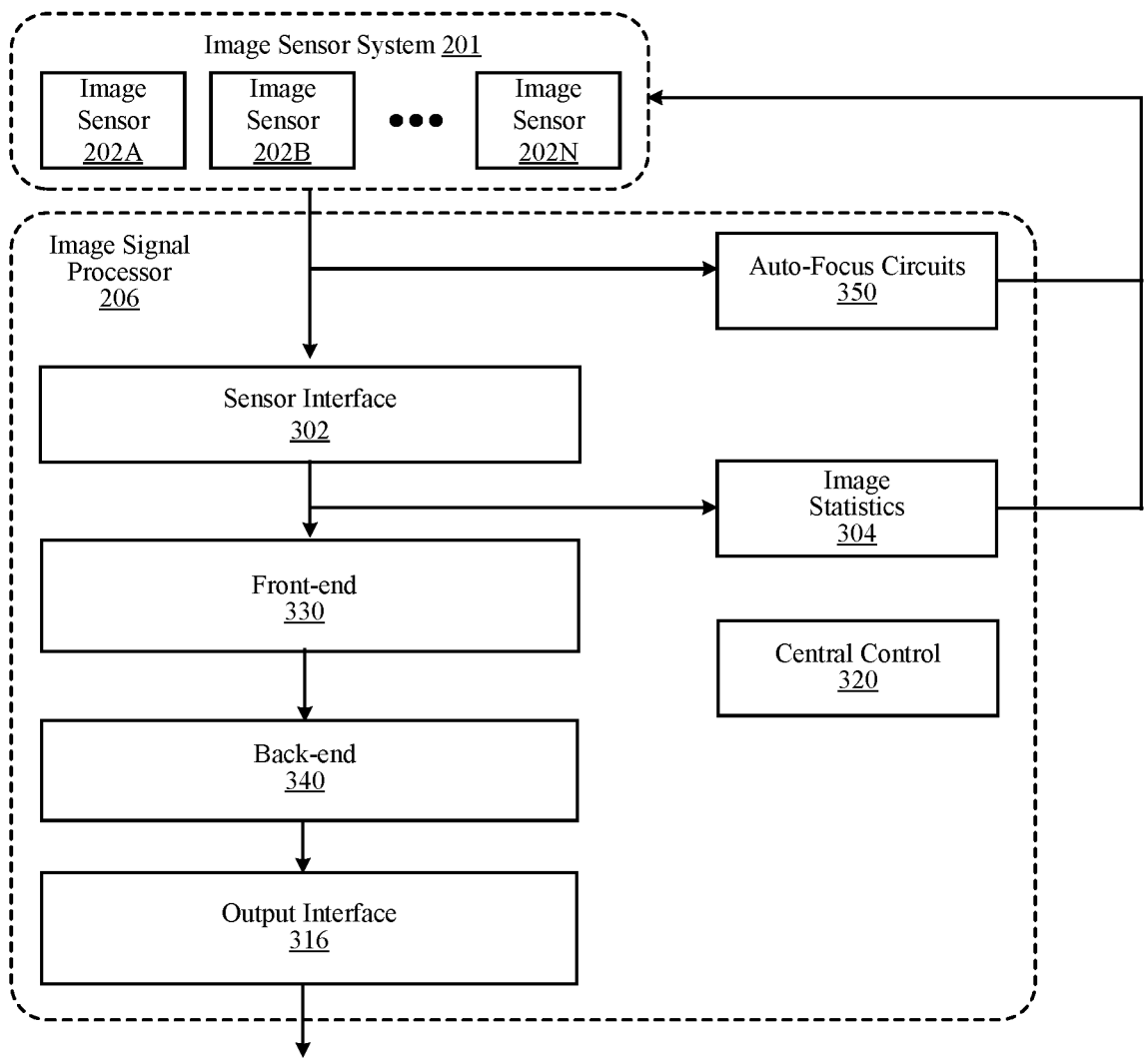
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface circuit 302, central control 320, front-end pipeline stages 330, back-end pipeline stages 340, image statistics module 304, output interface 316, and auto-focus circuits 350. ISP 206 may include other components not illustrated in FIG. 3 or may omit one or more components illustrated in FIG. 3.

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface circuit 302. In another embodiment, raw image data corresponding to both types of pixels may simultaneously be sent to both the auto-focus circuits 350 and the sensor interface circuit 302.

Auto-focus circuits 350 may include a hardware circuit that analyzes raw image data to determine an appropriate lens position of each image sensor 202. In one embodiment, the raw image data may include data that is transmitted from image sensing pixels that specialize in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics module 304 to determine information regarding auto-exposure.

Raw image data captured by different image sensors 202 may also be transmitted to a sensor interface circuit 302. Sensor interface circuit 302 interfaces with image sensor system 201 to receive sensor data from image sensor 202 and processes the sensor data into pixel data processable by other stages in the pipeline. In some embodiments, pixels are sent from the image sensor 202 to sensor interface circuit 302 in raster order (i.e., horizontally, line by line). The subsequent processes in the pipeline may also be performed in raster order and the result may also be output in raster order. Although only a single sensor interface circuit 302 is illustrated in FIG. 3, when more than one image sensor is provided in device 100, a corresponding number of sensor interface circuit circuits may be provided in ISP 206 to interface with each image sensor.

Front-end pipeline stages 330 process image data in raw or full-color domains. Front-end pipeline stages 330 may include, but are not limited to, raw processing stage and resample processing stage. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage may process image data in a Bayer raw format. The operations performed by raw processing stage include, but are not limited, sensor linearization, black level compensation, fixed pattern noise reduction, defective pixel correction, raw noise filtering, lens shading correction, white balance gain, and highlight recovery. Resample processing stage performs various operations to convert, resample, or scale image data received from raw processing stage. Operations performed by resample processing stage 308 may include, but not limited to, demosaic operation, per-pixel color correction operation, Gamma mapping operation, color space conversion and downscaling or sub-band splitting.

Central control 320 may control and coordinate overall operation of other components in ISP 206. Central control 320 performs operations including, but not limited to, monitoring various operating parameters (e.g., logging clock cycles, memory latency, quality of service, and state information), updating or managing control parameters for other components of ISP 206, and interfacing with sensor interface circuit 302 to control the starting and stopping of other components of ISP 206. For example, central control 320 may update programmable parameters for other components in ISP 206 while the other components are in an idle state. After updating the programmable parameters, central control 320 may place these components of ISP 206 into a run state to perform one or more operations or tasks. Central control 320 may also instruct other components of ISP 206 to store image data (e.g., by writing to system memory 230 in FIG. 2) before, during, or after resample processing stage. In this way full-resolution image data in raw or full-color domain format may be stored in addition to or instead of processing the image data output from resample processing stage through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, inverse black level compensation, white balancing compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistical data when preceding operations identify clipped pixels. Although only a single statistics module 304 is illustrated in FIG. 3, multiple image statistics modules may be included in ISP 206. For example, each image sensor 202 may correspond to an individual image statistics module 304. In such embodiments, each statistic module may be programmed by central control module 320 to collect different information for the same or different image data. In one or more embodiments, image statistics module 304 may include vision module that performs various operations to facilitate computer vision operations at CPU 208 such as facial detection in image data.

Although not illustrated in FIG. 3, ISP 206 may include a memory interface circuit to send to or receive image data from other components of SOC component 204. Such components may include system memory 230 that buffers the image data for various processing within or outside ISP 206.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage and color processing stage. Noise processing stage performs various operations to reduce noise in the image data. Color processing stage performs various operations associated with adjusting color information in the image data.

Back-end pipeline stages 340 may provide image data via the output interface 316 to various other components of device 100, as discussed above with regard to FIGS. 1 and 2.

In various embodiments, the functionally of components in ISP 206 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Structure of Sensor Interface Circuit

Figure 4:
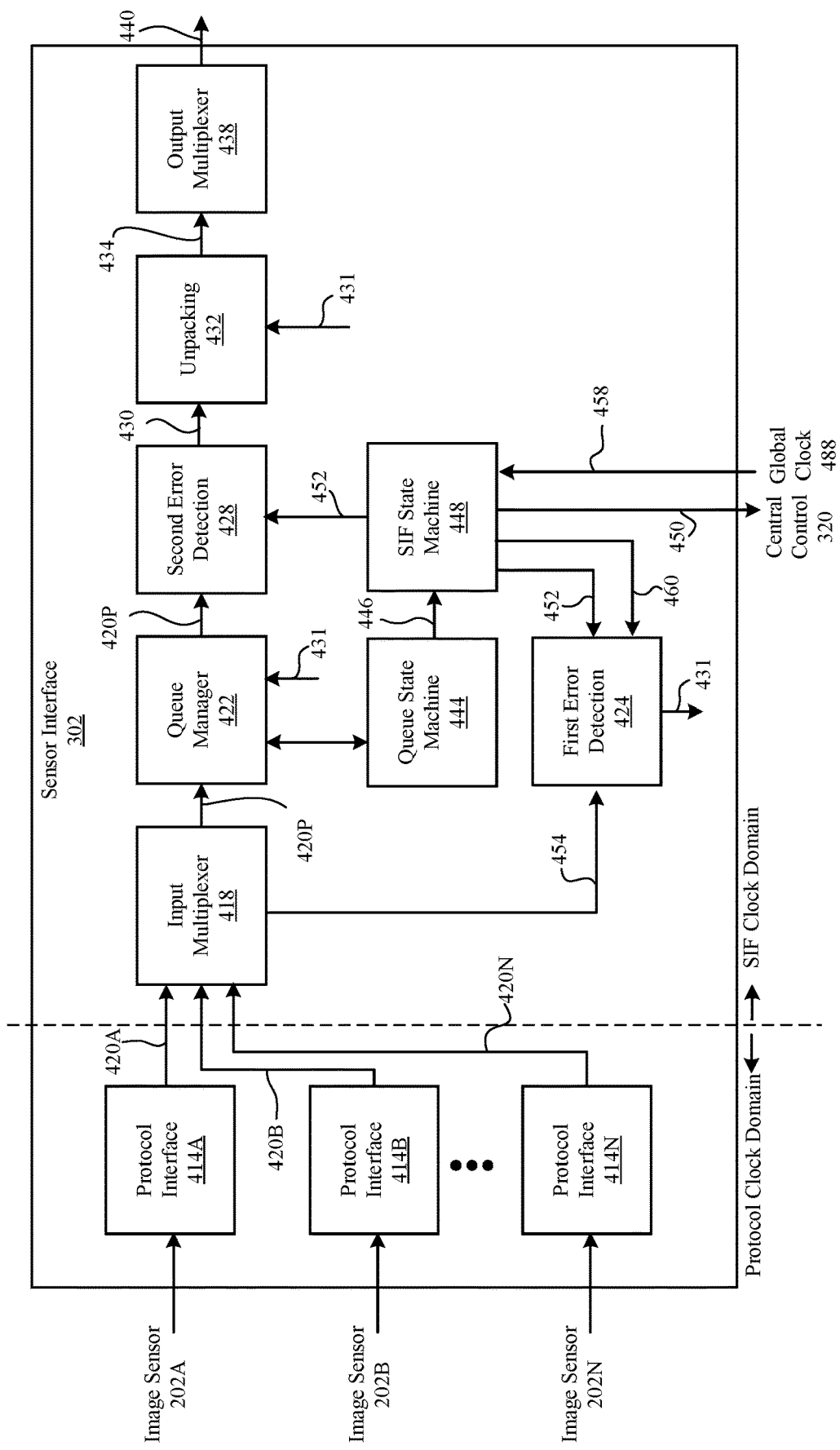
FIG. 4 is a block diagram of a sensor interface circuit, according to one embodiment.

Sensor interface circuit 302 is a circuit that interfaces with image sensors 202A through 202N to receive corresponding raw sensor signals and convert these raw sensor signals into image data 440 for processing or storing by other components of ISP 206 or device 100. For this purpose, sensor interface circuit 302 may include, among other components, protocol interface circuits 414A through 414N (hereinafter collectively as "protocol interface circuits 414" or individually as "protocol interface circuit 414"), input multiplexer 418, queue manager 422, first error detection circuit 424, second error detection circuit 428, unpacking circuit 432, output multiplexer 438, queue state machine 444 and sensor interface (SIF) state machine 448. Sensor interface circuit 302 may include components other than those illustrated in FIG. 4 or may omit some of the components illustrated in FIG. 4.

Protocol interface 414 is a circuit that interfaces with image sensor 202 via a connection such as a sensor bus (not shown). Image sensor 202 or the sensor bus may operate in a protocol clock domain that is different from a sensor interface (SIF) clock domain that is internal to sensor interface circuit 302. Raw sensor signals from image sensors 202 may be transmitted over sensor buses using, for example, Mobile Industry Processor Interface (MIPI) or Low Power Displayport (LPDP) protocol governed by a clock speed different from an internal clock speed of image statistics module 304. Hence, protocol interface 414 may perform operations to pass sensor signals across different color domains and produce adjusted sensor data 420A through 420N (hereinafter collectively referred to as "adjusted sensor data 420"). In one or more embodiments, protocol interface 414 may also function as a data doubler where the number of bits (e.g., 64 bits) in the original sensor signals is doubled in adjusted sensor data 420 (e.g., to 128 bits).

Adjusted sensor data 420 includes valid pixel signal 454 and pixel data 420P. Valid pixel signal 454 is a signal received by sensor interface circuit 302 and indicates valid pixel data was received at sensor interface circuit 302. Pixel data 420P includes pixel values of an image captured by image sensor 202, which may be in Bayer format, Quad Bayer format or other raw image formats.

Input multiplexer 418 is a circuit that selectively connects queue manager 422 to one of protocol interfaces 414 to receive pixel data 420P from the connected protocol interface 414. Input multiplexer 418 may switch the connection to different protocol interfaces 414 as programmed or instructed, forward pixel data 420P from the connected to protocol interface 414 to queue manager 422. In this way, sensor interface circuit 302 may interface with multiple image sensors 202. Further, valid pixel signal 454 is forwarded to first error detection circuit 424.

First error detection circuit 424 is a circuit that detects a first class of errors. The first class of error may be errors related to an entire frame of pixel data being omitted, being delayed or being dropped. One of such errors is a timeout error that occurs when valid pixel signal 454 is not timely received from image sensors 202. For this purpose, first error detection circuit 424 receives valid pixel signal 454 from input multiplexer 418, and SIF state signal 452 and latency signal 460 from SIF state machine 448. The details of detecting the timeout error are described below in detail with reference to FIGS. 6 and 7. First error detection circuit 424 generates and sends timeout signal 431 to unpacking circuit 432 depending on whether the timeout error is detected.

Queue manager 422 is a circuit that includes queues for buffering pixel data 420P for sending to subsequent components of sensor interface circuit 302. Queue manager 422 may have multiple queues of different priorities, as described below in detail with reference to FIG. 5. In one or more embodiments, queue manager 422 may receive timeout signal 431 from first error detection circuit 424. In response, queue manager 422 may blocked its queues from writing delayed pixel data 420P that arrived after receipt of timeout signal 431.

Second error detection circuit 428 is a circuit that detects a second class of errors different from the first class of errors. The second class of errors may include a frame being too short or too long. For this purpose, second error detection circuit 428 receives pixel data 420P from queue manager 422, and SIF state signal 452 from SIF state machine 448. The number of pixels in pixel data 420P is counted by second error detection circuit 428 so that the second class of errors may be detected. The second error detection circuit 428 sends valid pixel data 430 that may be an error corrected version of pixel data 420P to unpacking circuit 432.

Unpacking circuit 432 is a circuit that unpacks valid pixel data 430 to produce unpacked pixel data 434. Pixel data included in sensor data 420 may be in a packed or compressed format for efficient transferring and processing but may not be compatible for processing by ISP 206 or other components of device 100. Hence, unpacking circuit 432 unpacks or decompresses pixel data to unpacked pixel data 434. If timeout signal 431 is received and valid pixel data is not available, unpacking circuit 432 generates unpacked pixel data 434 that include a dummy frame where pixel values in the frame are filled with dummy values (e.g., 0). In one or more embodiments, the dummy values may be a replication of pixel values generated in a previous operation cycle. Unpacked pixel data 434 is sent to output multiplexer 438.

Queue state machine 444 is a circuit that tracks the states of queues in queue manager 422. Queue state machine 444 may track and control timing of memory circuits in queues for reading or writing operations. Queue state machine 444 may also send queue state signal 446 to SIF state machine 448 so that the state of sensor interface circuit 302 may be changed to an armed state where sensor interface 302 is ready to receive and process sensor data sensor data.

SIF state machine 448 is a circuit that defines the operational states of various components of sensor interface circuit 302. Sensor interface circuit 302 may have states such as idle, armed and busy. The idle state is a state where sensor interface circuit 302 is not performing any functions, the armed state is a state where sensor interface circuit 302 is ready to receive and process sensor data from image sensors 202, and the busy state is a state where sensor interface circuit 302 is processing the sensor data to generate packed pixel data or a dummy frame. SIF state machine 448 generates and sends signals to other components of sensor interface 302 depending on the current state to coordinate their operations. Such signals include, among other signals, idle state signal 450, SIF state signal 452 and latency signal 460. SIF state signal 452 indicates the current state of sensor interface circuit 302 as tracked by SIF state machine 448, and may indicate the time at which the sensor interface circuit 302 is placed in the armed state.

Latency signal 460 is a signal that indicates latency tolerance associated with receiving and processing of the sensor data at sensor interface circuit 302. Latency signal 460 may be used by central control 320 to determine how long sensor interface circuit 302 may withhold sending out image data 440 and clearing queue manager 422 of pixel data. In one or more embodiments, latency signal 460 is generated by SIF state machine 448 at a time when valid pixel signal 454 is received, if valid pixel signal 454 is received within a time limit as described below in detail with reference to FIG. 6. The time limit may be defined by global clock signal 458 sent by global clock 488. Conversely, if valid pixel signal 454 is not received within the time limit, latency signal 460 is generated in response to global clock signal 458, as described below in detail with reference to FIG. 7. Global clock 488 provides global clock signal 458 not only to sensor interface circuit 302 but to other circuits in device 100 or ISP 206. In addition to being sent to first error detection circuit 424, latency signal 460 may also be sent to central control 320 so that overall operations of device 100 may be coordinated appropriately.

Output multiplexer 438 is a circuit that forwards unpacked pixel data 434 to a desired target circuit. The target circuit may be, among others, system memory 230 or ISP 206. Output multiplexer 438 is connected to an appropriate connection (e.g., a bus) so that unpacked pixel data 434 is sent to the desired target circuit.

Figure 5:
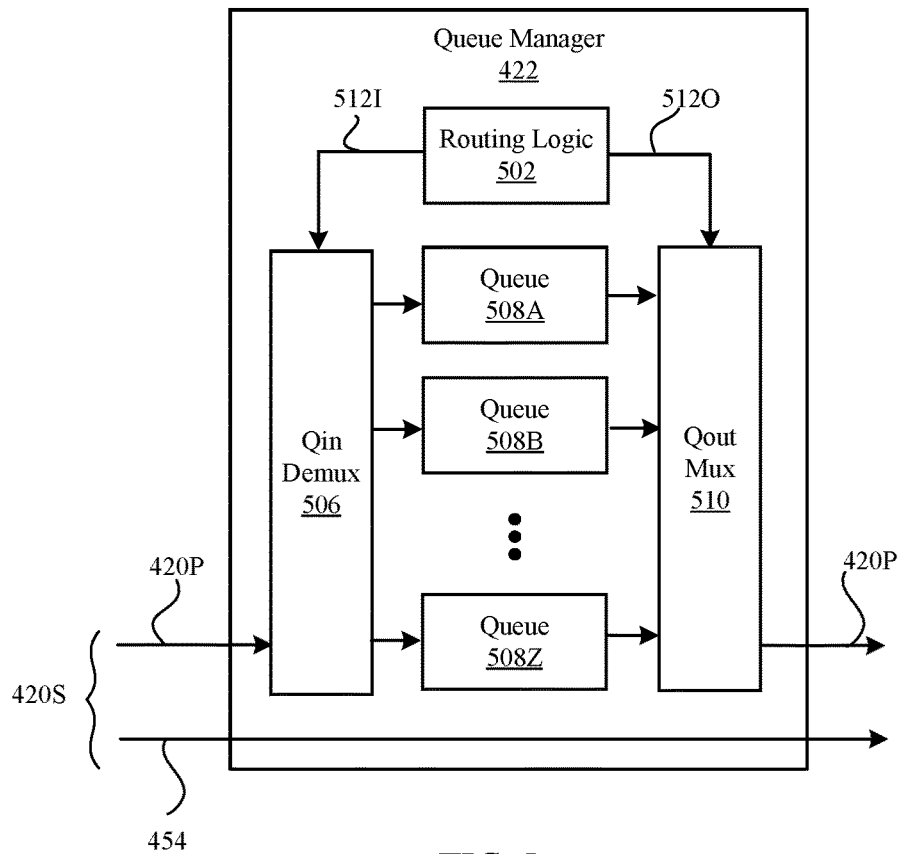
FIG. 5 is a block diagram of a queue manager, according to one embodiment.

FIG. 5 is a block diagram of queue manager 422, according to one embodiment. Queue manager 422 is a circuit that includes a plurality of queues 508A through 508Z (hereinafter collectively referred to as "queues 508") for storing portions of pixel data 420P Queue manager 422 receives pixel data 420P, assigns portions of pixel data 420P to different queues 508 for storing. For this purpose, queue manager 422 may further include, among other components, routing logic 502, Qin demultiplexer 506 and Qout multiplexer 510. Input multiplexer 418 selects and sends pixel data to queue manager 422. In response, Qin demultiplexer 506 switches from one queue to another as the queue is filled up. Each of the queues 508 may have a different priority so that data from a queue with a higher priority is read out for queue manager 422 before reading data from another queue with a lower priority. Qout multiplexer 510 reads out pixel data in the same sequence as Qin demultiplexer 506 stores the pixel data and sends the retrieved pixel data as pixel data 420P to second error detection circuit 428.

Routing logic 502 is a circuit, a firmware or a combination thereof that controls routing of pixel data 420P or portions of pixel data 420P to different queues 508. Each of queues 508 may be assigned with different priority, assigned to store pixel data 420P from different image sensors 202, assigned to store a predefined sections of pixel data 420P or be assigned to process according to other criteria, as programed or instructed. Routing logic 502 generates and sends control signals 512I, 512O to Qin demultiplexer 506 and Qout multiplexer 510, respectively to route pixel data 420P or portions thereof to second error detection circuit 428 at appropriate times.

Queues 508 are circuits for storing data, including pixel data 420P. Queues 508 may be embodied, for example, as static random-access memory (SRAM), flip-flops or other types of memory circuits to store pixel data 420P. The states of queues 508 (e.g., idle, writing, reading) may be tracked by queue state machine 444.

Qin demultiplexer 506 is a circuit that routes pixel data 420P or portions thereof to queues 508 according to control signal 512I. Qout multiplexer reads pixel data 420P or portions thereof from queues 508 and sends them to second error detection circuit 428.

Although multiple queues 508 are illustrated in FIG. 5, only a single queue may be implemented. Further, queues 508 may be embodied as a single physical memory device that is logically divided into different logical queues.

In one or more embodiments, valid pixel signal 454 is not stored in queues 508 but sent from input multiplexer 418 to first error detection circuit 424.

Example Operations by First Error Detection Circuit

Figure 6:
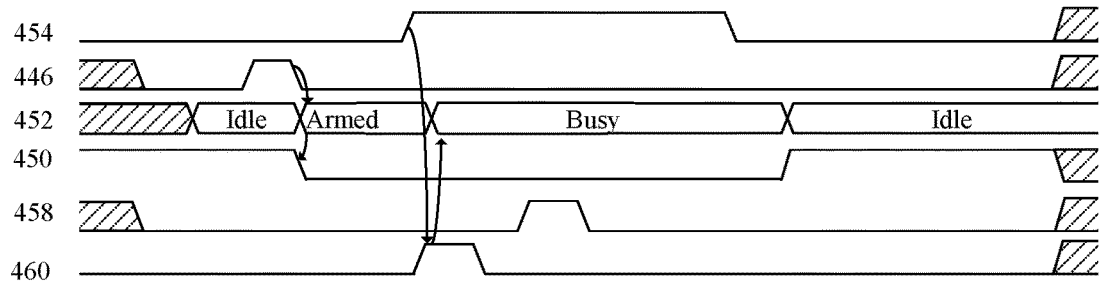
FIG. 6 is a timing diagram during a normal operation of pixel data received at the sensor interface circuit, according to one embodiment.

FIG. 6 is a timing diagram during a normal operation of pixel data receipt at sensor interface circuit 302, according to one embodiment. During the normal operation where no error is encountered, queue state signal 446 is generated by queue state machine 444. In response, SIF state machine 448 receives queue state signal 446 and the state of sensor interface circuit 302 is transitioned from the idle state to the armed state. In the example of FIG. 6, such transition occurs at the falling edge of queue state signal 446. Subsequently, sensor interface circuit 302 transitions from the armed state to the busy state, and then from the busy state to the idle state after the processing of sensor data 420 is terminated.

When sensor interface circuit 302 transitions to the armed state, SIF state machine 448 inactivates idle state signal 450 as shown by dropping of the voltage level of idle state signal 450. The inactivation of idle state signal 450 is sent to, among other components, central control 320.

When sensor data 420 arrives at sensor interface circuit 302 under its normal operation, valid pixel signal 454 in sensor data 420S also reaches SIF state machine 448 within a time limit defined by global clock signal 458 (e.g., corresponding to a falling edge of global clock signal 458). The arrival of valid pixel signal 454 at SIF state machine 448 then causes SIF state machine 448 to generate latency signal 460. Latency signal 460 is then provided to first error detection circuit 428 which initiates unpacking of pixel data 420P at unpacking circuit 432. Also, the state of sensor interface circuit 302 as tracked by SIF state machine 448 is updated to the busy state. In the normal operation, global clock signal 458 does not trigger any actions in sensor interface circuit 302.

Figure 7:
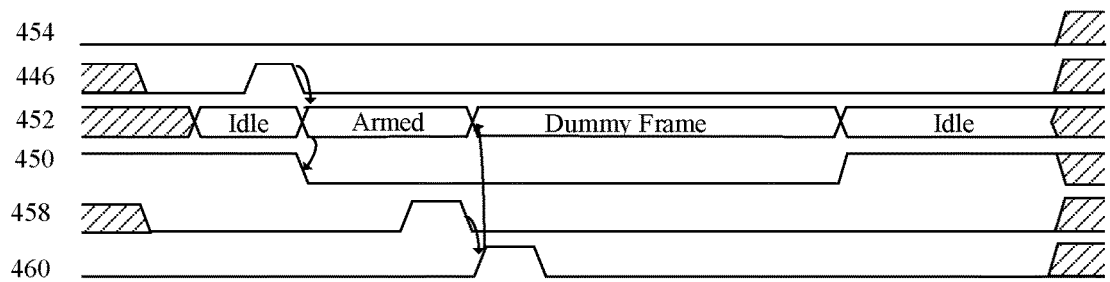
FIG. 7 is a timing diagram when a timeout error has occurred at the sensor interface circuit, according to one embodiment.

FIG. 7 is a timing diagram when a timeout error has occurred at sensor interface circuit 302, according to one embodiment. The operation of switching the state of sensor interface circuit 302 based on queue state signal 446 and deactivation of idle state signal 450 under the scenario of FIG. 7 is the same as that of FIG. 6. However, in the scenario of FIG. 7, valid pixel signal 454 is not received within the time limit. Hence, global clock signal 458 (e.g., the falling edge of global clock signal 458) causes latency signal 460 to turn active, which in turn transitions the state of sensor interface circuit 302 from the armed state to a state of generating a dummy frame by unpacking circuit 432. The dummy frame may be populated with pixel data of certain values (e.g., 0). The dummy frame is provided to output multiplexer 438 for processing by subsequent circuits.

Generation of the dummy frame beneficially reduces or eliminates the likelihood of interrupting processes at image processing pipeline and other circuits or operations that rely upon the processed image data. Image signal pipelines such front-end pipeline stages 330, back-end pipeline stages 340 and image statistics module 304 may continue to operate in the same way as in the case where no timeout error was encountered while having software handle the operations associated with the failure to receive valid pixel data from image sensors in a timely manner. Hence, the overall design of the image processing pipeline may be advantageously simplified.

Example Process of Interfacing with Image Sensor

Figure 8:
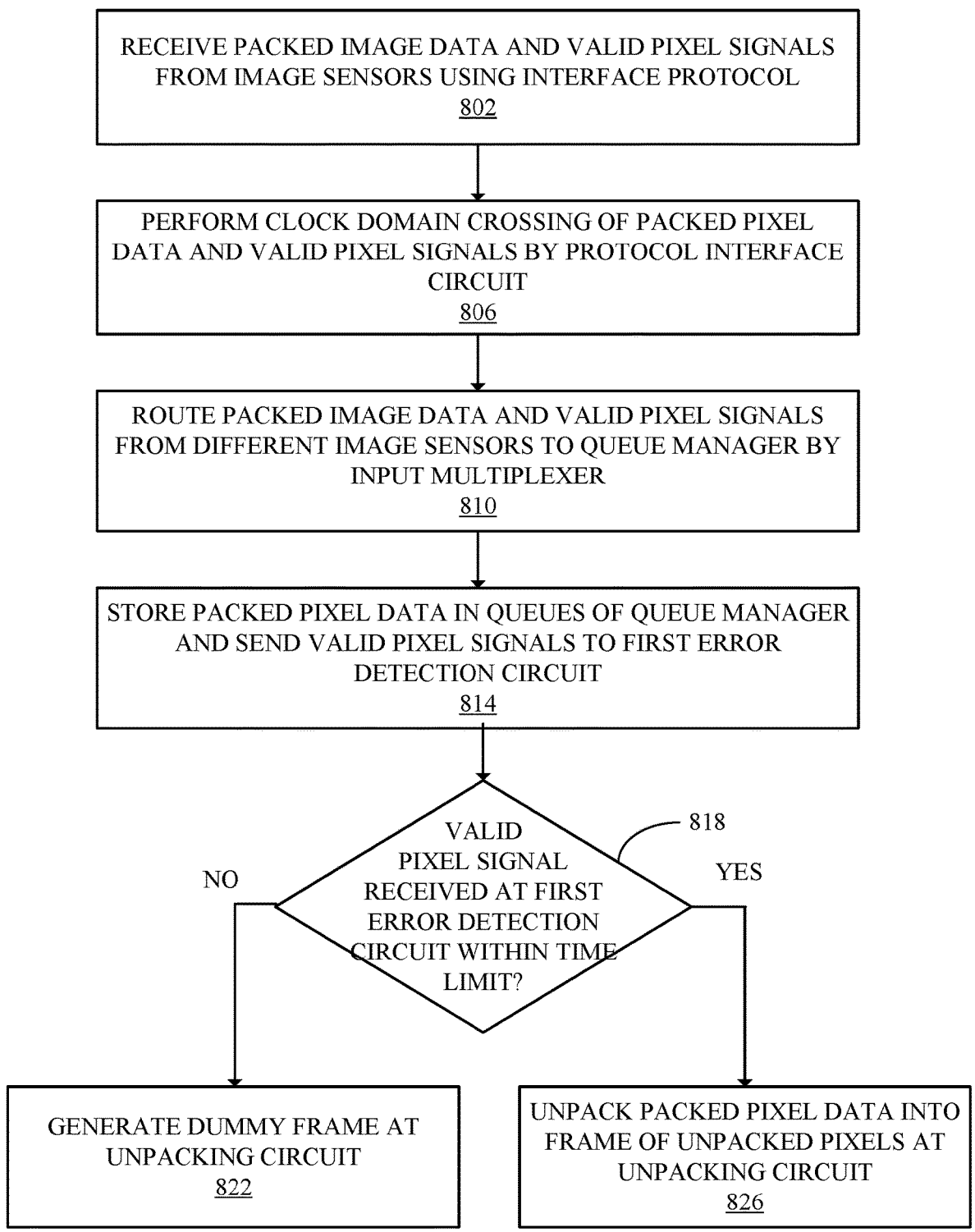
FIG. 8 is a flowchart illustrating a process of interfacing with image sensors at the sensor interface circuit, according to one embodiment.

FIG. 8 is a flowchart illustrating a process of interfacing with image sensors at the sensor interface circuit, according to one embodiment. Packed image data and valid pixel signals are received 802 as sensor data via a connection at protocol interface 414 using protocol such as MIPI or LPDP.

Protocol interface 414 performs 806 clock domain crossing of packed pixel data and valid pixel signal to generate adjusted sensor data. Data doubling operation may also be performed by protocol interface 414 during such clock domain crossing operation.

Input multiplexer 418 then routes 810 packed image data and the valid pixel signals from protocol interface 414 to queue manager 422 by selectively coupling a path to queue manager 422 with protocol interfaces 414. Queue manager 422 then stores 814 packed pixel data in queues of queue manager 422 while bypassing valid pixel signals to first error detection circuit 424. In this way, sensor data from different image sensors may be buffered and processed using the same queue manager 422.

Then first error detection circuit 424 determines 818 whether the valid pixel signal was received within a time limit defined by a global clock signal. If the valid pixel signal was not received within the time limit ("NO" in FIG. 8), unpacking circuit 432 generates 822 a dummy frame and sends the dummy frame to subsequent circuits. In contrast, if the valid pixel signal was received within the time limit ("YES" in FIG. 8), unpacking circuit 432 unpacks 826 the packed pixel data into a frame of unpacked pixels and sends the unpacked pixels to the subsequent circuits.

The process described with reference to FIG. 8 is merely illustrative. Additional steps may be performed as part of the process (e.g., detection of other errors at second error detection circuit 428) or certain steps may be omitted or performed in parallel with other steps.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A sensor interface circuit in an electronic device, comprising:
   a plurality of queues, each of the queues configured to store a portion of packed pixel data received from one or more image sensors;
   an error detection circuit coupled to the plurality of queues and configured to generate a timeout signal responsive to a valid pixel signal not being received from the one or more image sensors within a time limit, the valid pixel signal indicating receipt of the packed pixel data at the sensor interface circuit; and
   an unpacking circuit coupled to the error detection circuit and configured to generate a dummy frame of pixels responsive to receiving the timeout signal from the error detection circuit.

2. The sensor interface circuit of claim 1, wherein the error detection circuit is further configured to not generate the timeout signal responsive to receiving the valid pixel signal within the time limit.

3. The sensor interface circuit of claim 2, wherein the unpacking circuit is further configured to unpack the packed pixel data into a valid frame of unpacked pixels responsive to not receiving the timeout signal from the error detection circuit.

4. The sensor interface circuit of claim 2, wherein the valid pixel signal is not sent to the plurality of queues.

5. The sensor interface circuit of claim 2, further comprising:
   a plurality of protocol interface circuits, each of the protocol interface circuits communicating with the one or more image sensors using an interface protocol to receive the packed pixel data and perform clock domain crossing of the packed pixel data; and
   an input multiplexer circuit configured to selectively couple the plurality of queues to the plurality of protocol interface circuits to route the packed pixel data to the plurality of queues for storing.

6. The sensor interface circuit of claim 5, further comprising an output multiplexer circuit coupled to the unpacking circuit to route the dummy frame or a valid frame to circuits in the electronic device.

7. The sensor interface circuit of claim 2, further comprising a first state machine circuit configured to:
   place the sensor interface circuit in a state of a plurality of states, and
   send, to the error detection circuit, state information indicative of the state of the sensor interface circuit, the error detection circuit generating the timeout signal based on the state information.

8. The sensor interface circuit of claim 7, wherein the time limit is defined by a global clock that provides a clock signal to the sensor interface circuit and at least another circuit in the electronic device.

9. The sensor interface circuit of claim 8, wherein the error detection circuit is further configured to generate the timeout signal responsive to receiving a latency signal generated at the time limit or in response to receiving the valid pixel signal within the time limit, the timeout signal generated responsive to not receiving the valid pixel signal before the time limit.

10. The sensor interface circuit of claim 7, further comprising a second state machine circuit coupled to the first state machine circuit, and configured to:
    track states of the plurality of queues, and
    generate and send a queue signal to the first state machine circuit, the queue signal indicative of the states of the plurality of queues, the first state machine circuit changing the state of the sensor interface circuit responsive to receiving the queue signal.

11. A method of interfacing with one or more image sensors, comprising:
    storing packed pixel data received from one or more image sensors in a plurality of queues of a sensor interface circuit coupled to the one or more image sensors;
    generating, by an error detection circuit of the sensor interface circuit, a timeout signal responsive to a valid pixel signal not being received from the one or more image sensors within a time limit, the valid pixel signal indicating receipt of the packed pixel data at the sensor interface circuit; and
    generating, by an unpacking circuit of the sensor interface circuit, a dummy frame of pixels responsive to receiving the timeout signal from the error detection circuit.

12. The method of claim 11, further comprising skipping generation of the timeout signal responsive to receiving the valid pixel signal within the time limit.

13. The method of claim 12, further comprising unpacking the packed pixel data into a valid frame of unpacked pixels by the unpacking circuit responsive to not receiving the timeout signal from the error detection circuit.

14. The method of claim 12, wherein the valid pixel signal is not sent to the plurality of queues for storage.

15. The method of claim 12, further comprising:
sending the packed pixel data from the one or more image sensors to a plurality of protocol interface circuits of the sensor interface circuit using an interface protocol;
performing, by the sensor interface circuit, clock domain crossing of the packed pixel data; and
selectively coupling, by an input multiplexer circuit of the sensor interface circuit, the plurality of queues to the plurality of protocol interface circuits to route the packed pixel data to the plurality of queues for storage.

16. The method of claim 15, further comprising routing the dummy frame or a valid frame by an output multiplexer circuit of the sensor interface circuit.

17. The method of claim 12, further comprising:
placing the sensor interface circuit in a state of a plurality of states by a first state machine circuit, and
sending, to the error detection circuit, state information indicative of the state of the sensor interface circuit by the first state machine circuit, wherein the timeout signal is generated based on the state information.

18. The method of claim 17, wherein the time limit is defined by a global clock that provides a clock signal to the sensor interface circuit and at least another circuit.

19. The method of claim 18, wherein the timeout signal is generated by the error detection circuit responsive to receiving a latency signal, the latency signal is generated responsive to receiving the valid pixel signal or after passage of the time limit, and the timeout signal is generated responsive to not receiving the valid pixel signal before the time limit.

20. The method of claim 17, further comprising:
tracking states of the plurality of queues by a second state machine circuit,
generating a queue signal from the second state machine circuit to the first state machine circuit, the queue signal indicative of the states of the plurality of queues, and
changing the state of the sensor interface circuit by the first state machine circuit responsive to receiving the queue signal.

21. An electronic device comprising:
one or more image sensors;
a sensor interface circuit coupled to the one or more image sensors, comprising:
a plurality of queues, each of the queues configured to store a portion of packed pixel data received from the one or more image sensors,
an error detection circuit coupled to the plurality of queues and configured to generate a timeout signal responsive to a valid pixel signal not being received from the one or more image sensors within a time limit, the valid pixel signal indicating receipt of the packed pixel data at the sensor interface circuit, and
an unpacking circuit coupled to the error detection circuit and configured to generate a dummy frame of pixels responsive to receiving the timeout signal from the error detection circuit; and
an image signal pipeline circuit configured to receive the dummy frame for processing.

\* \* \* \* \*